(12) United States Patent
Gkoulalas-Divanis et al.

(10) Patent No.: US 11,449,674 B2
(45) Date of Patent: Sep. 20, 2022

(54) UTILITY-PRESERVING TEXT DE-IDENTIFICATION WITH PRIVACY GUARANTEES

(71) Applicant: International Business Machines Corporation, Armonk, NY (US)

(72) Inventors: Aris Gkoulalas-Divanis, Waltham, MA (US); Paul R. Bastide, Ashland, MA (US); Xu Wang, Westford, MA (US); Rohit Ranchal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/860,857

(22) Filed: Apr. 28, 2020

(65) Prior Publication Data
US 2021/0334455 A1 Oct. 28, 2021

(51) Int. Cl.
*G06F 40/205* (2020.01)
*G06F 21/62* (2013.01)
(Continued)

(52) U.S. Cl.
CPC ........ *G06F 40/205* (2020.01); *G06F 21/6254* (2013.01); *G06F 40/117* (2020.01); *G06F 40/169* (2020.01)

(58) Field of Classification Search
CPC ............................ G06F 21/6254; G06F 40/117
See application file for complete search history.

(56) References Cited

U.S. PATENT DOCUMENTS 7,269,578 B2 * 9/2007 Sweeney ............ G06F 21/6245
705/74

7,617,193 B2 * 11/2009 Bitan .................... G06F 16/951
(Continued)

FOREIGN PATENT DOCUMENTS

| EP | 3496091 B1 | 6/2019 |
| JP | 2010231717 A | 10/2010 |
| WO | 2019017500 A1 | 1/2019 |

OTHER PUBLICATIONS

Mell et al., "The NIST Definition of Cloud Computing," National Institute of Standards and Technology Special Publication 800-145, Sep. 2011, 7 pages.

(Continued)

*Primary Examiner* — Benjamin Smith
(74) *Attorney, Agent, or Firm* — Sherman IP LLP; Kenneth L. Sherman; Hemavathy Perumal

(57) ABSTRACT

One embodiment of the invention provides a method for utility-preserving text de-identification. The method comprises generating corresponding processed text for each text document by applying at least one natural language processor (NLP) annotator to the text document to recognize and tag privacy-sensitive personal information corresponding to an individual, and replacing some words in the text document with some replacement values. The method further comprises determining infrequent terms occurring across all processed texts, filtering out the infrequent terms from the processed texts, and selectively reinstating to the processed texts at least one of the infrequent terms that is innocuous. The method further comprises generating a corresponding de-identified text document for each processed text by anonymizing privacy-sensitive personal information corresponding to an individual in the processed text to an extent that preserves data utility of the processed text and conceals the individual's personal identity.

16 Claims, 6 Drawing Sheets

(51) Int. Cl.
  *G06F 40/117* (2020.01)
  *G06F 40/169* (2020.01)

(56) References Cited

U.S. PATENT DOCUMENTS

| | | | |
|---|---|---|---|
| 8,285,540 B2 | 10/2012 | Sato et al. | |
| 8,468,244 B2* | 6/2013 | Redlich | G06Q 10/107 709/225 |
| 8,924,852 B2* | 12/2014 | Ikawa | G06F 3/14 715/256 |
| 9,043,250 B2* | 5/2015 | Ling | G06F 21/6254 703/2 |
| 9,081,978 B1* | 7/2015 | Connolly | G06F 21/10 |
| 9,705,908 B1* | 7/2017 | Thakurta | G06N 20/00 |
| 9,712,550 B1* | 7/2017 | Thakurta | G06N 20/00 |
| 9,846,716 B1* | 12/2017 | Scott | G06F 16/245 |
| 9,892,281 B1* | 2/2018 | Scott | G06F 21/6245 |
| 10,573,312 B1 | 2/2020 | Thomson et al. | |
| 10,713,390 B2* | 7/2020 | Anderson | G06F 21/6245 |
| 10,783,990 B2* | 9/2020 | Lyman | G06K 9/6256 |
| 10,805,244 B2* | 10/2020 | Gilbert | H04L 51/046 |
| 10,938,779 B2* | 3/2021 | Loyola | H04L 61/303 |
| 11,107,564 B2* | 8/2021 | Poblenz | G06N 5/04 |
| 11,217,223 B2* | 1/2022 | Gkoulalas-Divanis | G10L 21/00 |
| 2007/0043723 A1* | 2/2007 | Bitan | G06F 16/951 |
| 2007/0133437 A1 | 6/2007 | Wengrovitz et al. | |
| 2008/0077604 A1 | 3/2008 | Bharara et al. | |
| 2009/0254572 A1* | 10/2009 | Redlich | G06Q 10/06 |
| 2011/0055185 A1* | 3/2011 | Bitan | G06F 16/951 707/706 |
| 2011/0191673 A1* | 8/2011 | Ikawa | G06F 3/14 715/273 |
| 2014/0040172 A1* | 2/2014 | Ling | G06N 5/022 706/12 |
| 2014/0278366 A1 | 9/2014 | Jacob et al. | |
| 2015/0081302 A1 | 3/2015 | Syrdal et al. | |
| 2016/0203336 A1 | 7/2016 | Nambiar et al. | |
| 2016/0321582 A1* | 11/2016 | Broudou | G06N 20/00 |
| 2017/0019356 A1* | 1/2017 | Gilbert | H04L 51/04 |
| 2017/0359364 A1* | 12/2017 | Thakurta | G06F 40/242 |
| 2019/0005952 A1 | 1/2019 | Kruse et al. | |
| 2019/0018983 A1* | 1/2019 | Anderson | G06F 21/6245 |
| 2019/0104124 A1 | 4/2019 | Buford | |
| 2019/0236310 A1* | 8/2019 | Austin | G06F 21/6254 |
| 2019/0238516 A1* | 8/2019 | Weggenmann | G06F 21/6254 |
| 2019/0260784 A1* | 8/2019 | Stockdale | H04L 51/22 |
| 2019/0318744 A1 | 10/2019 | Bromand et al. | |
| 2019/0356672 A1* | 11/2019 | Bondugula | H04L 63/205 |
| 2019/0371328 A1 | 12/2019 | Wang et al. | |
| 2019/0385591 A1 | 12/2019 | Shin et al. | |
| 2020/0110903 A1* | 4/2020 | Reilly | H04N 1/4446 |
| 2020/0151246 A1* | 5/2020 | Mwarabu | G06V 30/268 |
| 2020/0160122 A1* | 5/2020 | Lints | G06K 9/6269 |
| 2020/0160301 A1* | 5/2020 | Lyman | G06F 9/542 |
| 2020/0160969 A1* | 5/2020 | Poblenz | G06T 7/0014 |
| 2020/0320167 A1* | 10/2020 | Mane | G06F 40/284 |
| 2020/0394333 A1* | 12/2020 | Norgeot | G16H 10/60 |
| 2020/0396204 A1* | 12/2020 | Loyola | G06F 16/951 |
| 2020/0402625 A1* | 12/2020 | Aravamudan | G06F 21/602 |
| 2021/0133254 A1* | 5/2021 | Adam | H04L 41/5067 |
| 2021/0182111 A1* | 6/2021 | Jakobsson | G06F 9/52 |
| 2021/0248268 A1* | 8/2021 | Ardhanari | G06N 3/0472 |
| 2021/0256160 A1* | 8/2021 | Hachey | G06F 40/295 |
| 2021/0279366 A1* | 9/2021 | Choudhury | G06F 21/6227 |
| 2021/0334455 A1* | 10/2021 | Gkoulalas-Divanis | G06F 21/6254 |
| 2021/0335337 A1* | 10/2021 | Gkoulalas-Divanis | G10L 17/02 |
| 2021/0335464 A1* | 10/2021 | Poblenz | G16H 40/20 |
| 2022/0044667 A1* | 2/2022 | Gkoulalas-Divanis | G06F 21/6254 |

OTHER PUBLICATIONS

Ribaric, S. et al., "Deidentification for privacy protection in multimedia content: A survey," Signal Processing: Image Communication, Sep. 2016, pp. 131-151, vol. 47, downloaded on Apr. 27, 2020, https://uhra.herts.ac.uk/bitstream/handle/2299/19652/Accepted_Manuscript.pdf?sequence=2, University of Hertfordshire, UK.

Snyder, D. et al., "X-Vectors: Robust DNN Embeddings for Speaker Recognition", IEEE International Conference on Acoustics, Speech and Signal Processing (ICASSP), Apr. 15, 2018, pp. 1-5, IEEE, United States.

Ibrahim, NS et al., "I-vector Extraction for Speaker Recognition Based on Dimensionality Reduction," Procedia Computer Science, Jan. 2018, pp. 1534-1540, Elsevier, The Netherlands.

Meystre, S.M. et al., "Automatic de-identification of textual documents in the electronic health record: A review of recent research", BMC Medical Research Methodology, 2010, Chapter 26, pp. 1-16, downloaded Apr. 27, 2020, https://bmcmedresmethodol.biomedcentral.com/track/pdf/10.1186/1471-2288-10-70, United States.

Meystre, S.M. et al., "De-identification of unstructured clinical data for patient privacy protection", Springer's Medical Data Privacy Handbook, 2015, pp. 697-716, Springer, Cham, Switzerland {Abstract Only}.

Stubbs, A. et al., "Challenges in synthesizing surrogate PHI in narrative EMRs", Springer's Medical Data Privacy Handbook, 2015, Chapter 27, pp. 717-735, Springer, Cham, Switzerland.

List of IBM Patents or Applications Treated as Related: Gkoulalas-Divanis, A. et al., U.S. Appl. No. 16/860,840, filed Apr. 28, 2020.

List of IBM Patents or Applications Treated as Related: Gkoulalas-Divanis, A. et al., U.S. Appl. No. 17/452,563, filed Oct. 27, 2021.

* cited by examiner

UTILITY-PRESERVING TEXT DE-IDENTIFICATION WITH PRIVACY GUARANTEES

BACKGROUND

Embodiments of the invention generally relate to data privacy protection, and more specifically, to a method and system for utility-preserving text de-identification under data privacy guarantees.

SUMMARY

One embodiment of the invention provides a method for utility-preserving text de-identification. The method comprises, for each text document of a set of text documents, generating corresponding processed text by applying at least one natural language processor (NLP) annotator to the text document to recognize and tag privacy-sensitive personal information corresponding to an individual, and replacing at least one word in the text document with at least one replacement value. The at least one word includes a portion of the privacy-sensitive personal information. The method further comprises determining a set of infrequent terms occurring across all processed texts corresponding to the text documents, filtering out the set of infrequent terms from the processed texts, and selectively reinstating to the processed texts at least one of the set of infrequent terms that is innocuous. The method further comprises, for each processed text, generating a corresponding de-identified text document by anonymizing privacy-sensitive personal information in the processed text to an extent that preserves data utility of the processed text and conceals a personal identity of an individual that the privacy-sensitive personal information corresponds to.

Another embodiment of the invention provides a system for utility-preserving text de-identification. The system comprises at least one processor, and a non-transitory processor-readable memory device storing instructions that when executed by the at least one processor causes the at least one processor to perform operations. The operations include, for each text document of a set of text documents, generating corresponding processed text by applying at least one natural language processor (NLP) annotator to the text document to recognize and tag privacy-sensitive personal information corresponding to an individual, and replacing at least one word in the text document with at least one replacement value. The at least one word includes a portion of the privacy-sensitive personal information. The operations further include determining a set of infrequent terms occurring across all processed texts corresponding to the text documents, filtering out the set of infrequent terms from the processed texts, and selectively reinstating to the processed texts at least one of the set of infrequent terms that is innocuous. The operations further include, for each processed text, generating a corresponding de-identified text document by anonymizing privacy-sensitive personal information in the processed text to an extent that preserves data utility of the processed text and conceals a personal identity of an individual that the privacy-sensitive personal information corresponds to.

One embodiment of the invention provides a computer program product for utility-preserving text de-identification. The computer program product comprises a computer readable storage medium having program instructions embodied therewith. The program instructions are executable by a processor to cause the processor to, for each text document of a set of text documents, generate corresponding processed text by applying at least one natural language processor (NLP) annotator to the text document to recognize and tag privacy-sensitive personal information corresponding to an individual, and replace at least one word in the text document with at least one replacement value. The at least one word includes a portion of the privacy-sensitive personal information. The program instructions further cause the processor to determine a set of infrequent terms occurring across all processed texts corresponding to the text documents, filter out the set of infrequent terms from the processed texts, and selectively reinstate to the processed texts at least one of the set of infrequent terms that is innocuous. The program instructions further cause the processor to, for each processed text, generate a corresponding de-identified text document by anonymizing privacy-sensitive personal information in the processed text to an extent that preserves data utility of the processed text and conceals a personal identity of an individual that the privacy-sensitive personal information corresponds to.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

Figure 1:
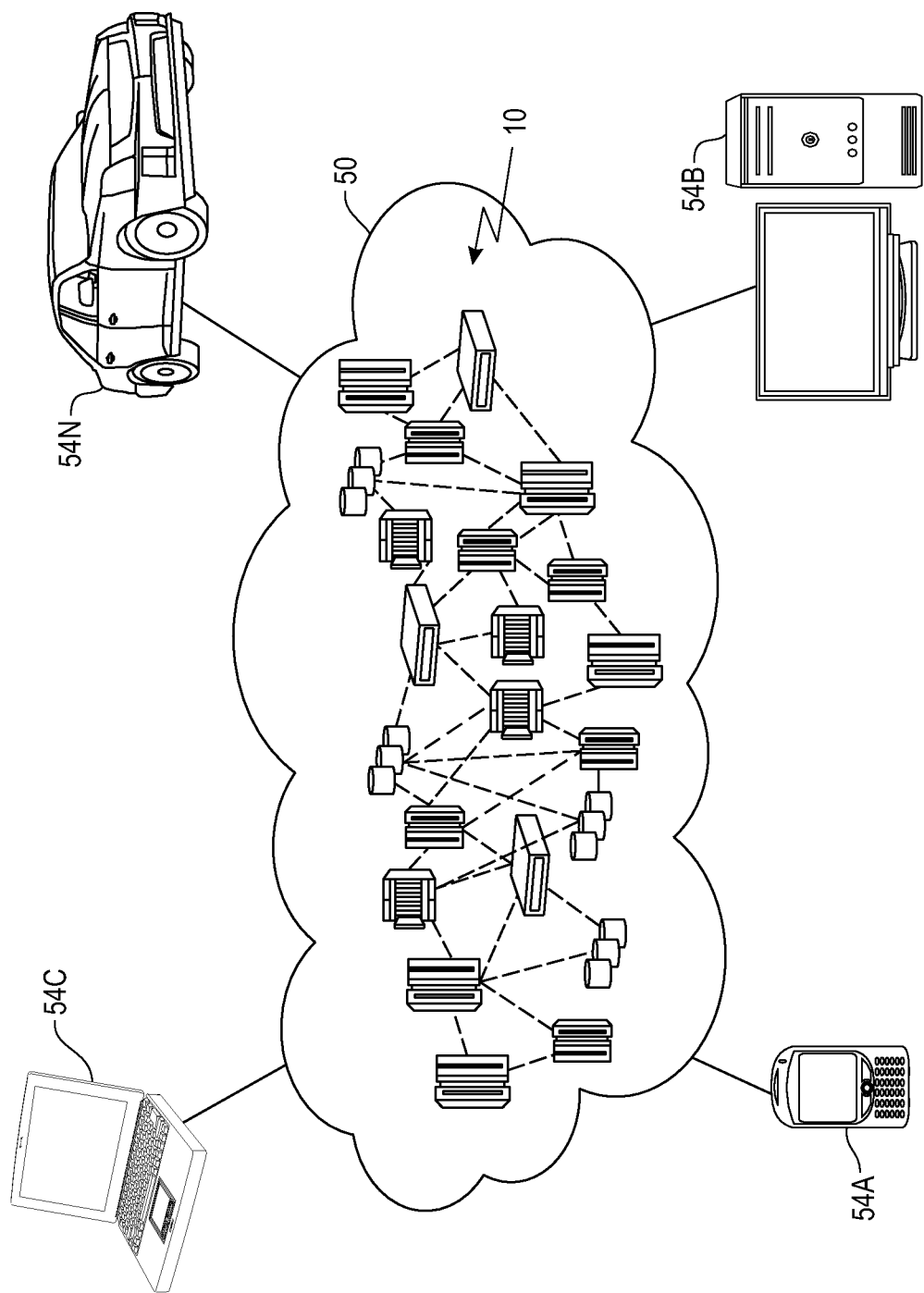
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to data privacy protection, and more specifically, to a method and system for utility-preserving text de-identification under data privacy guarantees. One embodiment of the invention provides a method for utility-preserving text de-identification. The method comprises, for each text document of a set of text documents, generating corresponding processed text by applying at least one natural language processor (NLP) annotator to the text document to recognize and tag privacy-sensitive personal information corresponding to an individual, and replacing at least one word in the text document with at least one replacement value. The at least one word includes a portion of the privacy-sensitive personal information. The method further comprises determining a set of infrequent terms occurring across all processed texts corresponding to the text documents, filtering out the set of infrequent terms from the processed texts, and selectively reinstating to the processed texts at least one of the set of infrequent terms that is innocuous. The method further comprises, for each processed text, generating a corresponding de-identified text document by anonymizing privacy-sensitive personal information in the processed text to an extent that preserves data utility of the processed text and conceals a personal identity of an individual that the privacy-sensitive personal information corresponds to.

Another embodiment of the invention provides a system for utility-preserving text de-identification. The system comprises at least one processor, and a non-transitory processor-readable memory device storing instructions that when executed by the at least one processor causes the at least one processor to perform operations. The operations include, for each text document of a set of text documents, generating corresponding processed text by applying at least one natural language processor (NLP) annotator to the text document to recognize and tag privacy-sensitive personal information corresponding to an individual, and replacing at least one word in the text document with at least one replacement value. The at least one word includes a portion of the privacy-sensitive personal information. The operations further include determining a set of infrequent terms occurring across all processed texts corresponding to the text documents, filtering out the set of infrequent terms from the processed texts, and selectively reinstating to the processed texts at least one of the set of infrequent terms that is innocuous. The operations further include, for each processed text, generating a corresponding de-identified text document by anonymizing privacy-sensitive personal information in the processed text to an extent that preserves data utility of the processed text and conceals a personal identity of an individual that the privacy-sensitive personal information corresponds to.

One embodiment of the invention provides a computer program product for utility-preserving text de-identification. The computer program product comprises a computer readable storage medium having program instructions embodied therewith. The program instructions are executable by a processor to cause the processor to, for each text document of a set of text documents, generate corresponding processed text by applying at least one natural language processor (NLP) annotator to the text document to recognize and tag privacy-sensitive personal information corresponding to an individual, and replace at least one word in the text document with at least one replacement value. The at least one word includes a portion of the privacy-sensitive personal information. The program instructions further cause the processor to determine a set of infrequent terms occurring across all processed texts corresponding to the text documents, filter out the set of infrequent terms from the processed texts, and selectively reinstate to the processed texts at least one of the set of infrequent terms that is innocuous. The program instructions further cause the processor to, for each processed text, generate a corresponding de-identified text document by anonymizing privacy-sensitive personal information in the processed text to an extent that preserves data utility of the processed text and conceals a personal identity of an individual that the privacy-sensitive personal information corresponds to.

For expository purposes, the term "de-identification" generally refers to a process of preventing an individual's personal identity from being revealed. A personal identity of an individual comprises information indicative of one or more private characteristics of the individual, i.e., privacy-sensitive personal information or personally identifiable information (PII) such as, but not limited to, gender, age, health, emotions, education, origin, etc. A third party may infer an identity of an individual if privacy-sensitive personal information of the individual is revealed to the third party.

For expository purposes, the term "text document" generally refers to a document comprising textual content/data (i.e., text).

For expository purposes, the terms "text de-identification" generally refer to a process of applying de-identification to one or more text documents comprising privacy-sensitive personal information about an individual to prevent the individual's personal identity from being revealed from the text documents. Specifically, text de-identification involves removing PII from text documents that could otherwise be used to re-identify and/or reveal privacy-sensitive sensitive personal information about individuals. Text de-identification is a legal requirement in many countries worldwide (e.g., Health Insurance Portability and Accountability Act (HIPAA) in the U.S., General Data Protection Regulation (GDPR) in the EU, etc.) in order to make use of textual data to support secondary purposes, such as clinical studies. Applying de-identification to text is more difficult than applying de-identification to structured data (e.g., relational tables, transactional data, event sequences, and user trajectories), as text de-identification requires discovering all PII that is present in the text and concealing it (e.g., masking, replacing, or suppressing).

PII can be categorized in one of two broad categories—direct identifiers and quasi-identifiers. For expository purposes, the term "direct identifier" generally refers to a data attribute, a word, a token, or a value that can be used alone to identify an individual. A direct identifier can uniquely correspond to an individual, such that it reveals an identity of the corresponding individual when present in data. Examples of direct identifiers include, but are not limited to, person names, social security numbers, national IDs, credit card numbers, phone numbers, medical record numbers, IP addresses, account numbers, etc.

For expository purposes, the terms "indirect identifier" or "quasi-identifier" generally refers to a data attribute, a word, a token, or a value that cannot be used alone to identify an individual, but can be used in combination with one or more other indirect/quasi-identifiers to identify the individual. A combination of indirect/quasi-identifiers corresponding to an individual can be unique or extremely rare, such that the combination can reveal an identity of the corresponding individual when present in data, or the combination can be linked to the identity of the corresponding individual with a record in an external publicly available data set (e.g., voter registration list, decennial records, U.S. census, etc.) that contains a name of the corresponding individual. Examples of indirect/quasi-identifiers include, but are not limited to, date of birth, gender, zip code, etc. For example, for a large portion of the U.S. population, the combination of date-of-birth, gender, and five-digit zip code is unique.

Conventional approaches in text de-identification generally fall into two categories: (1) grammar-based/rule-based approaches that utilize hand-coded rules, data dictionaries, and regular expressions for recognizing PII in text that follow a standard syntactic pattern (e.g., known patterns for phones, zip codes, addresses, etc.), and (b) machine learning approaches that rely on manually annotated training data with pre-labeled identifiers to build classifiers that classify terms of previously unseen text documents as 'identifier' or 'non-identifier'. Both categories of approaches suffer from serious shortcomings. Rule-based approaches are highly susceptible to grammatical errors, typos, and PII that are not part of the data dictionaries utilized or that follow an unknown pattern that is not recognized by the regular expressions used. Machine learning approaches are highly dependent on the availability of large volumes of training data and tend to perform very poorly when presented with text documents to classify that do not follow the same structure as the training data. Another concern with conventional solutions for text de-identification is over-scrubbing which involves concealing (e.g., masking, removing, or suppressing) many more words or terms than necessary from a text document in order to improve performance in capturing PII.

Embodiments of the invention provide a method and system for utility-preserving text de-identification of text documents that protects privacy-sensitive personal information included in the text documents with data privacy guarantees. The text de-identification applied anonymizes the privacy-sensitive personal information to an extent that preserves data utility of the text documents (i.e., utility-preserving text identification). One embodiment applies a plurality of natural language processing (NLP) annotators to the text documents to process the text documents. Some of the NLP annotators utilize rule-based approaches in text de-identification, while the remaining NLP annotators utilize machine learning approaches instead. Each PII recognized (i.e., detected) by each NLP annotator applied to the text documents is collected and aggregated to determine which of the collected PII is actually present in the text documents. One embodiment ensures that all direct identifiers, even those not recognized by the NLP annotators, are removed from the text documents. One embodiment provides a solution to over-scrubbing by reinstating one or more words or terms to the text documents that were previously recognized as potential PII (e.g., by the NLP annotators) and concealed (e.g., generalized, masked, redacted, removed, or suppressed). The invention guarantees that text resulting from the text de-identification is fully de-identified, even if the NLP annotators applied were unable to recognize all personal and sensitive information.

To maximize data utility of text resulting from the text de-identification, one embodiment extracts each quasi-identifier recognized (e.g., by the NLP annotators) from the text documents, applies a syntactic anonymization approach that is based on a type of the quasi-identifier to anonymize the quasi-identifier and preserve data utility of the quasi-identifier, and replaces the quasi-identifier in the text documents with the resulting anonymized value (e.g., the quasi-identifier is generalized, masked, redacted, removed, or suppressed). One embodiment guarantees that, for each quasi-identifier, there exists at least k individuals with corresponding text documents that contain an anonymized value or combination of anonymized values for the quasi-identifier. Therefore, a likelihood of a third party (e.g., an attacker) performing a successful re-identification of an individual based on an anonymized value (or a combination of anonymized values) for a quasi-identifier in a text document corresponding to the individual is bounded by 1/k (e.g., an attacker knows a particular combination of values for a quasi-identifier, such as date of birth, gender, or 5-digit zip code). In one embodiment, k is set by a data owner or a de-identification expert.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to ofi-fer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
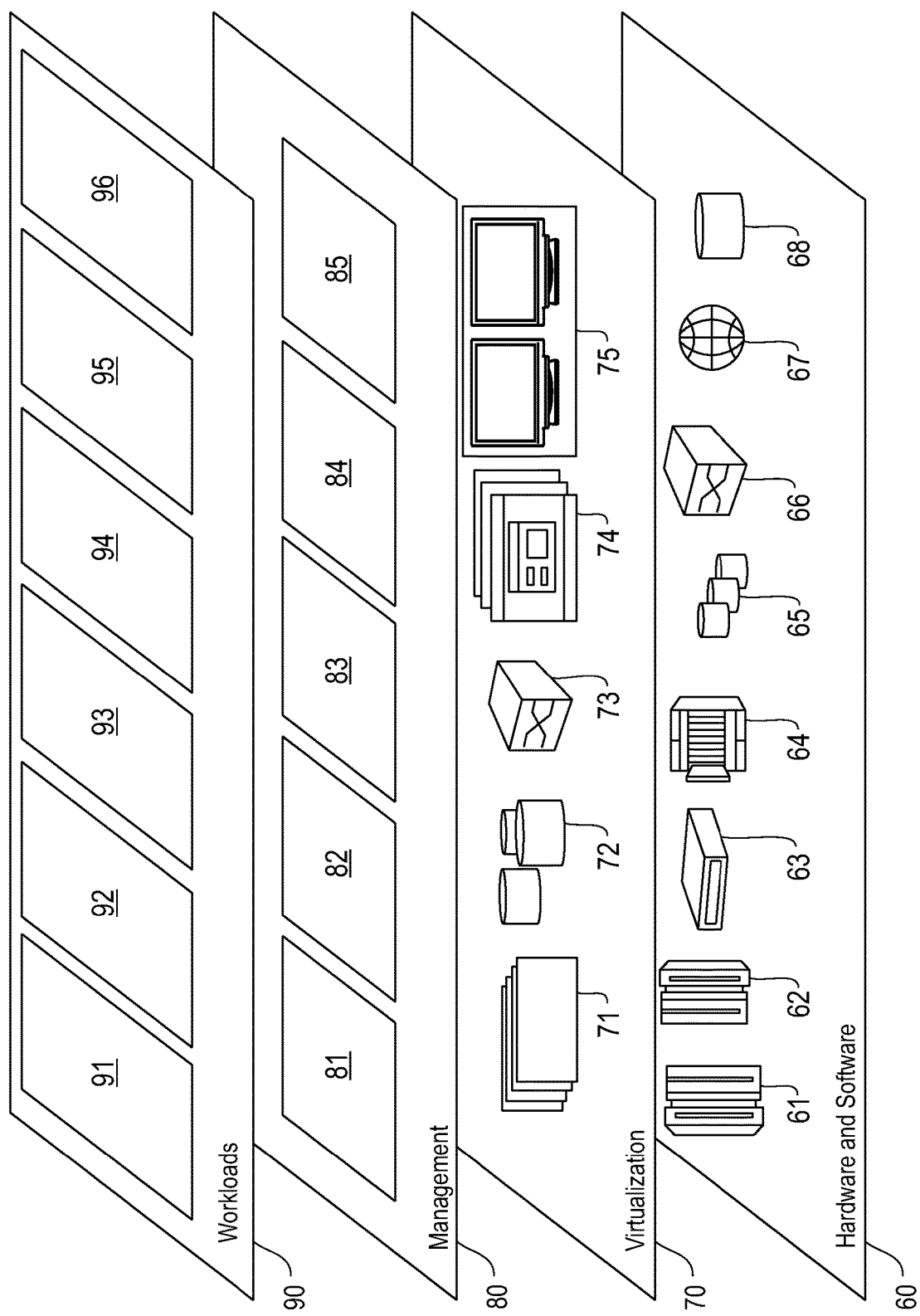
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and text de-identification 96 (e.g., a utility-preserving text de-identification system 330, as described in detail later herein).

Figure 3:
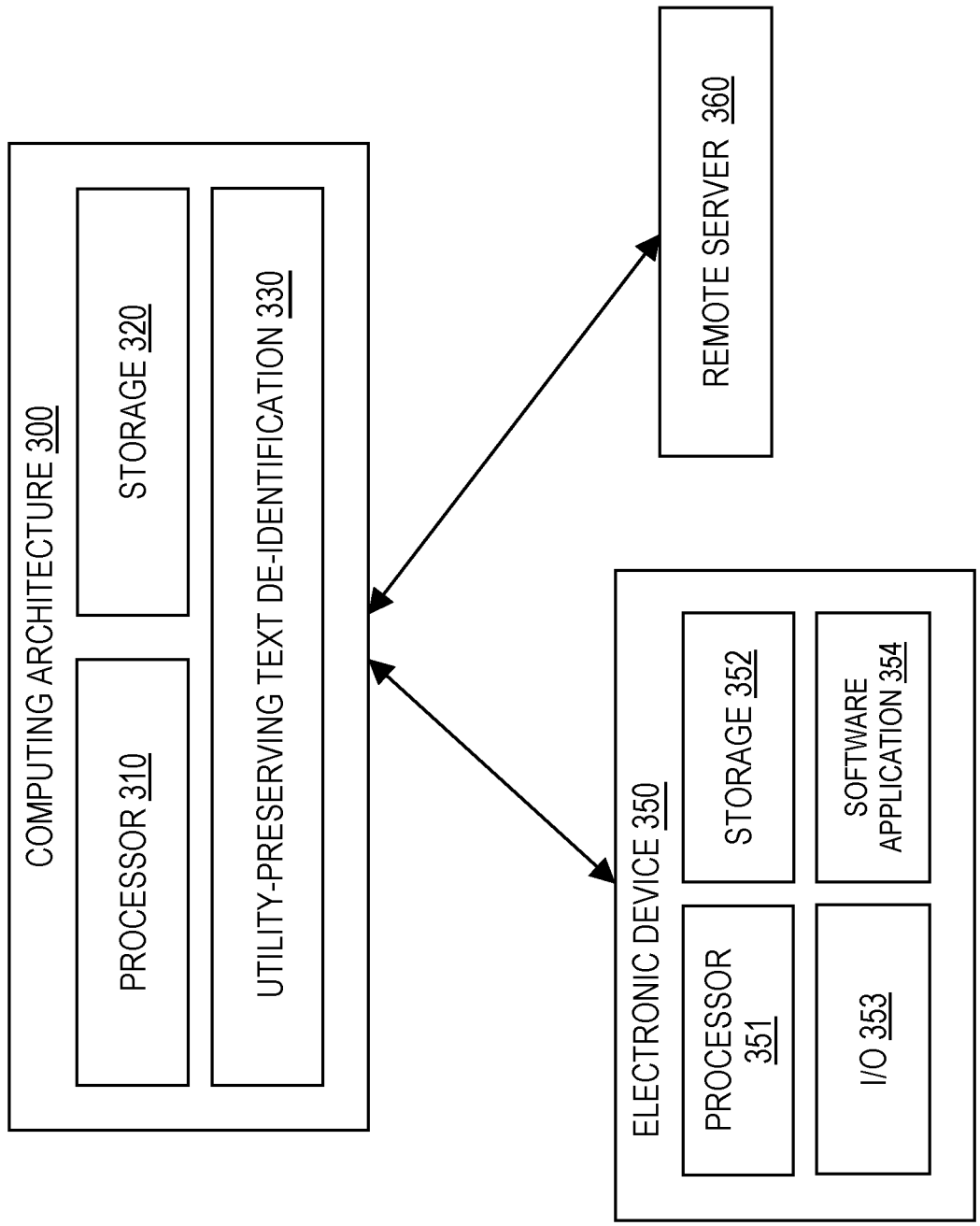
FIG. 3 illustrates an example computing architecture for implementing utility-preserving text de-identification, in accordance with an embodiment of the invention.

FIG. 3 illustrates an example computing architecture 300 for implementing utility-preserving text de-identification, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a utility-preserving text de-identification system 330 configured for text de-identification.

As described in detail later herein, in one embodiment, the system 330 is configured to receive a data set comprising a set of text documents, wherein the text documents comprise privacy-sensitive personal information (i.e., PII) about a set of individuals. The system 330 is configured to apply utility-preserving text de-identification to at least one of the text documents. The text de-identification applied anonymizes all privacy-sensitive personal information included in the at least one text document to an extent that preserves data utility of the at least one text document and does not reveal the privacy-sensitive personal information, resulting in at least one corresponding de-identified text document from which the privacy-sensitive personal information cannot be inferred. For each text document that comprises privacy-sensitive personal information about an individual, the system 330 is configured to produce a resulting de-identified text document that conceals an identity (i.e., personal identity) of the individual. Each de-identified text document produced by the system 330 is suitable for release to a third party for secondary use (e.g., can be shared with one or more third parties to support medical studies).

In one embodiment, the system 330 is configured to receive a corresponding textual document (e.g., from the textual document generation unit 450 (FIG. 4)), wherein the textual document comprises all processed textual content corresponding to the same individual (i.e., all the processed textual content comprises privacy-sensitive personal information about the individual that has been masked, replaced, suppressed, and/or tagged), and (2) generate corresponding de-identified textual content by applying content de-identification to the textual document. The content de-identification applied anonymizes all the processed textual content included in the textual document to an extent that preserves data utility of all the processed textual content and does not reveal any privacy-sensitive personal information about the individual. All de-identified textual content generated by the data representation unit 470 (FIG. 4) is suitable for release to a third party for secondary use.

For example, in one embodiment, the data set comprises notes of physicians included in electronic health records (EHR) and documenting the physicians' encounters with patients, wherein the notes contains protected health information (PHI) about the patients. The system 330 extracts a subset of the notes (i.e., extracts one or more of the notes), and de-identifies the extracted subset (i.e., applies utility-preserving text de-identification to the extracted notes) to conceal identities of the physicians and anonymize the PHI about the patients. As privacy-sensitive personal information (e.g., PHI) about the patients cannot be inferred from the resulting de-identified extracted subset (i.e., resulting de-identified notes), the de-identified extracted subset may be shared with one or more third parties to support secondary use, such as medical studies.

In one embodiment, the system 330 is incorporated/integrated into a cloud computing environment (e.g., IBM Cloud®, etc.).

In one embodiment, the text de-identification system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, big data analytics applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O unit 353 of an electronic device 350 to configure one or more user preferences, configure one or more parameters (e.g., thresholds, bounds, etc.), provide input (e.g., requests), etc.

In one embodiment, an electronic device 350 and/or a remote server device 360 may be a data source providing a data set for utility-preserving text de-identification.

In one embodiment, the text de-identification system 330 may be accessed or utilized by one or more online services (e.g., AI services, big data analytics services, data processing services) hosted on a remote server device 360 and/or one or more software applications 354 (e.g., AI applications, big data analytics applications, data processing applications) operating on an electronic device 350.

Figure 4:
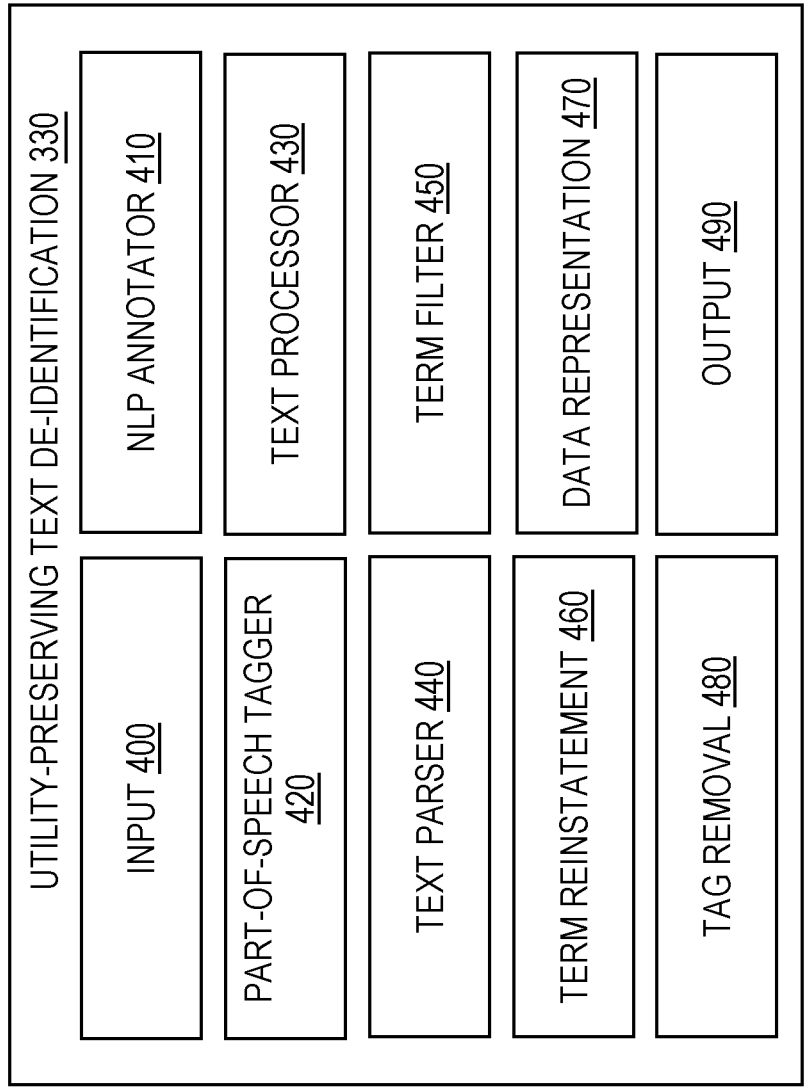
FIG. 4 illustrates an example utility-preserving text de-identification system, in accordance with an embodiment of the invention.

FIG. 4 illustrates an example utility-preserving text de-identification system 330, in accordance with an embodiment of the invention. In one embodiment, the system 330 comprises an input unit 400 configured to receive a dataset comprising a collection of text data. In one embodiment, the collection of text data comprises a plurality of text documents. The text documents comprise privacy-sensitive personal information, such as PHI or other personally identifiable information (PII), about (i.e., concerning or involving) a plurality of individuals.

In one embodiment, the system 330 comprises one or more NLP annotators 410 and a text processor unit 430. Some of the NLP annotators 410 utilize rule-based approaches in text de-identification, while the remaining NLP annotators 410 utilize machine learning approaches instead. In one embodiment, some of the NLP annotators 410 utilize one or more Part-of-Speech (PoS) taggers 420. For each of the text documents, the text processor unit 430 is configured to generate corresponding processed text by applying the NLP annotators 410 to the text document to recognize and process privacy-sensitive personal information (e.g., PHI or other PII) contained in the text document. Specifically, for each of the text documents, the text processor unit 430 is configured to: (1) parse text included in the text document utilizing the NLP annotators 410 to recognize (i.e., find or locate) at least one direct identifier and/or at least one quasi-identifier in the text document, and (2) process each identifier (i.e., direct identifier and/or quasi-identifier) recognized in the text document based on a type of the identifier, resulting in processed text that corresponds to the text document. As described in detail below, each identifier in the processed text is tagged and its value generalized, masked, redacted, removed, suppressed, and/or tagged.

In one embodiment, for each identifier recognized in each text document, the text processor unit 430 processes the identifier by tagging the identifier with one or more tags that indicate a type of the identifier (e.g., start tag <DI_PROC> and end tag </DI_PROC> if the identifier is a direct identifier, start tag <QI_ROC> and end tag </QI_ROC> if the identifier is a quasi-identifier instead).

In one embodiment, for each known direct identifier recognized in each text document, the text processor unit 430 processes the direct identifier by applying a data masking method to the direct identifier to conceal an original value of the direct identifier with a masked value (i.e., replacement value) that is based on a type of the direct identifier. The data masking method applied may involve generalizing, masking, redacting, or suppressing. For example, in one embodiment, if the direct identifier is a name, the text processor unit 430 replaces the original name in the text document with a random name (e.g., extracted from a dictionary, extracted from a publicly available dataset such as a voters' registration list, etc.) or a pseudonym (e.g., "Patient1234").

In one embodiment, for each known quasi-identifier recognized in each text document, the text processor unit 430 processes the quasi-identifier by tagging the quasi-identifier with one or more tags that are based on a type of the quasi-identifier (e.g., age, gender, location, date, zip code, etc.). For example, in one embodiment, if the quasi-identifier is an age, the text processor unit 430 is configured to tag the quasi-identifier with one or more tags that indicate the quasi-identifier is an age.

In one embodiment, for each known quasi-identifier recognized in each text document, the text processor unit 430 is optionally configured to further process the quasi-identifier by applying a data generalization method to an original value of the quasi-identifier to conceal the quasi-identifier with a generalized value. The generalized value is of a degree/level of generalization that preserves data utility of the quasi-identifier (e.g., sufficient to support a secondary use that a resulting de-identified text document is released for). In one embodiment, the degree/level of generalization is set by a data owner or a de-identification expert (e.g., via an I/O unit 353).

In one embodiment, if a segment (i.e., portion) of a text document contains an unidentified concept (e.g., not recognized by a NLP annotator), the text processor unit 430 is configured to annotate or mark the segment as "unknown", such that the segment is ignored for further processing by the system 330.

For expository purposes, the term "PII word" generally refers to a word (or term) in a text document that is either a known direct identifier or a known quasi-identifier recognized in the text document (e.g., recognized by the NLP annotators 410 via the text processor unit 430). For expository purposes, the term "non-PII word" generally refers to a word (or term) in a text document that is not a PII word (i.e., neither a known direct identifier nor a known quasi-identifier recognized in the text document). Non-PII words cannot be linked to an individual's personal identity.

In one embodiment, the system 330 comprises a text parser unit 440. The text parser unit 440 is configured to: (1) receive each processed text corresponding to each of the text documents (e.g., from the processing unit 430), and (2) parse each processed text to produce a union of terms/tokens that appear in the processed text and that exclude each PII word recognized (i.e., each known direct identifier and each known quasi-identifier recognized via the text processor unit 430). In one embodiment, the data representation unit 470 maintains a term frequency list comprising, for each term/token of the union, a corresponding term frequency indicative of a number of times the term/token appears (i.e., occurs) across all the processed text. In one embodiment, the data representation unit 470 maintains a term frequency list comprising, for each term/token of the union, a corresponding term frequency indicative of a number of text documents that contain the term/token.

In one embodiment, the system 330 comprises a term filter unit 450. For each of the text documents, the term filter unit 450 is configured to: (1) receive a corresponding processed (e.g., from the processing unit 430), (2) receive a union of terms/tokens that appear in the processed text and that exclude each PII word recognized (e.g., from the text parser unit 440), and (3) determine which terms of the text document are infrequent based on each term frequency corresponding to each term of the union of terms and a frequency threshold. Each term in the text document determined as infrequent is selected for pruning. For each infrequent term/token selected for pruning, the term filter unit 450 is configured to prune (i.e., filter out) the infrequent term/token from the processed text.

In one embodiment, a frequency threshold is derived from at least one blacklist/dictionary for direct identifiers (e.g., a list of names extracted from a publicly available dataset such as a voters' registration list). For example, in one embodiment, the term filter unit 450 utilizes the at least one blacklist/dictionary to determine a maximum frequency F associated with a direct identifier recognized in the text documents, wherein the maximum frequency F is set as a frequency threshold for use in selecting infrequent terms for pruning. For example, in one embodiment, the term filter unit 450 selects for pruning all terms/tokens with corresponding term frequencies that are less than the frequency threshold F, such that remaining terms/tokens not selected for pruning have corresponding term frequencies that do not exceed the frequency threshold F.

The term filter unit 450 selects unique terms and low-frequency terms (collectively, infrequent terms) occurring in the processed texts for pruning. The system 330 initially assumes each infrequent term selected for pruning is a PII word. The invention guarantees that text resulting from the text de-identification is fully de-identified, even if the NLP annotators applied were unable to recognize all personal and sensitive information. However, an infrequent term selected for pruning may actually be a non-PII word that need not be pruned (i.e., filtered out) from the P textual documents. To account for infrequent terms that are actually non-PII words, the system 330 optionally comprises a term reinstatement unit 460. The term reinstatement unit 460 is configured to reinstate one or more infrequent terms selected for pruning (e.g., via the text filter unit 450) to each processed text based on at least one whitelist of innocuous terms. Each infrequent term selected for pruning but included in the at least one whitelist is recognized by the term reinstatement unit 460 as a known non-PII word and reinstated to each processed text. Examples of whitelists the term reinstatement unit 460 may utilize include, but are not limited to, known whitelists for content de-identification, lexical databases (e.g., Wordnet).

In one embodiment, the system 330 comprises a data representation unit 470. The data representation unit 470 is configured to extract each known quasi-identifier recognized in each processed text and create a corresponding record of structured data (i.e., structured representation) based on a list of known quasi-identifiers. The list of known quasi-identifiers identifies one or more structured representations for maintaining one or more values for one or more known types of quasi-identifiers. For example, if the list of known quasi-identifiers is defined as {date of birth, gender, 5-digit zip code}, the list identifies a first structured representation for maintaining a value for the known type date of birth, a second structured representation for maintaining a value for the known type gender, and a third structured representation for maintaining a value for the known type 5-digit zip code. In one embodiment, the list of known quasi-identifiers is derived based on publicly available datasets in the domain that the text documents are in (i.e., pertain to). In another embodiment, the list of known quasi-identifiers is provided by a data owner or a de-identification expert (e.g., via an I/O unit 353).

Specifically, for each known type included in the list of known quasi-identifiers, the data representation unit 470 is configured to: (1) locate all processed text corresponding to the text documents that contain at least one quasi-identifier tagged with one or more tags that indicate the known type, and (2) for each processed text located, create a corresponding record of structured data maintaining a value for the known type. For example, if the known type is date of birth and the quasi-identifier is "Nov. 2, 1980", the record created comprises the following structured data: date of birth="Nov. 2, 1980". As another example, if the known type is gender and the quasi-identifier is "he", the record created comprises the following structured data: gender="M". As yet another example, if the known type is zip code and the quasi-identifier is "12345", the record created comprises the following structured data: zip code="12345".

In one embodiment, for each processed text corresponding to each text document, the data representation unit 470 is configured to suppress each quasi-identifier in the processed text that is tagged with one or more tags that indicate a type of quasi-identifier not included in the list of known quasi-identifiers.

In one embodiment, the data representation unit 470 supports a plurality of anonymization algorithms. For each record of structured data created, the data representation unit 470 is configured to select, among the plurality of anonymization algorithms, an appropriate syntactic anonymization approach (i.e., algorithm) to apply to the record to anonymize at least one value maintained in the record, resulting in an anonymized record of structured data maintaining an anonymized value. In one embodiment, for a known type included in the list of quasi-identifiers, the data representation unit 470 is optionally configured to apply a micro-aggregation approach to all records of structured data maintaining values for the known type, resulting in anonymized records of structured data maintaining random values for the known type, wherein the random values are computed over a micro-aggregate. For each processed text corresponding to each text document, the data representation unit 470 is configured to replace each quasi-identifier recognized in the processed text with an anonymized/random value for a known type of the quasi-identifier, wherein the anonymized/random value is obtained from an anonymized record of structured data corresponding to the processed text.

In one embodiment, the system 330 comprises a tag removal unit 480. The tag removal unit 480 is configured to: (1) receive each processed text corresponding to each text document (e.g., from the data representation unit 470), and (2) remove each tag that each identifier recognized in the processed text is tagged with, resulting in corresponding de-identified text document.

In one embodiment, the system 330 comprises an output unit 490. For each of the text documents, the output unit 490 is configured to release a corresponding de-identified text document to a third party for secondary use. The output unit 490 releases de-identified information only. The output unit 490 does not release any original text document received by the input unit 400.

In one embodiment, for each text document comprising privacy-sensitive information about an individual, the system 330 is configured to generate a corresponding de-identified text document that protects the individual among k other individuals. These conditions provide data privacy guarantees on potential re-identification (by a third party) of the original identity of the individual. If the corresponding de-identified text document is released to, or intercepted by, a third party, a probability of the third party successfully identifying the individual (i.e., inferring an identity of the individual) from the de-identified text document is bounded by 1/k. Therefore, a likelihood of the third party (e.g., an attacker) performing a successful re-identification of the individual from the de-identified text document is bounded by 1/k. In one embodiment, k is set by a data owner or a de-identification expert (e.g., via an I/O unit 353). In one embodiment, k is a re-identification risk threshold provided as input by a data owner or a de-identification expert, and used to enforce a required/necessary level of privacy protection (i.e., likelihood of re-identification).

In one embodiment, the system 330 utilizes automated frequency-based term suppression that operates along with NLP annotators and whitelists to offer holistic protection from direct identifiers appearing in text documents. Further, the system 330 offers a comprehensive way of dealing with quasi-identifiers utilizing lists of plausible/known quasi-identifiers, transaction/sequence/trajectory anonymization, as well as mixed data type anonymization, to maintain maximal utility in replacement values for the quasi-identifiers under data privacy guarantees.

In one example application scenario, assume the system 330 receives a request, via the input unit 400, to apply utility-preserving text de-identification to three (3) given text documents. Assume the three given text documents comprise privacy-sensitive personal information about a plurality of individuals.

Table 1 below provides example text data included in the three given text documents received by the input unit 420.

TABLE 1

| Document 1 |
| --- |
| PHYSICIAN: Dudley, Carmen, M.D.<br>Jane Alan (ID43729) is a 70-year-old woman with a history of a left renal mass who presented for laparoscopic partial nephrectomy. She was admitted on Aug. 15, 2013 and discharged on Aug. 17, 2013. She was instructed to follow up with Dr. Becket. |
| Document 2 |
| PHYSICIAN: Dudley, Carmen, M.D.<br>Mr. Ted Borret is 65-y.o. (ID53265). He was admitted on Aug. 16, 2013 to evaluate for weakness and balance issues. His blood pressure was found low and was instructed to rest. He was discharged on Aug. 16, 2013. He was given no prescription. |

TABLE 1-continued

Document 3

PHYSICIAN: Bob, Veep, M.D.
Cathie Trian (ID54355) is a 68 years old female with Crohn's disease. Attended cycling event and experienced breathing difficulties. Went to the emergency department and elevated heart enzymes were found. Was admitted on Aug. 14, 2013 to the ICU for care of pneumonia and discharged on Aug. 17, 2013. She was instructed to follow up with Dr. Boris.

As shown in Table 1, the three given text documents include: (1) Document 1 comprising notes of a physician Carmen Dudley, M. D., wherein the notes comprises privacy-sensitive personal information (e.g., PHI or other PII) about a patient Jane Alan, (2) Document 2 comprising different notes of the physician Carmen Dudley, M. D., wherein the different notes comprise privacy-sensitive personal information about a patient Mr. Ted Borret, and (3) Document 3 comprising notes of a physician Veep Bob, M. D., wherein the notes comprise privacy-sensitive personal information about a patient Cathie Trian.

Table 2 below provides example processed texts resulting from applying the text processor unit 430 to the documents of Table 1. For reference, each identifier (i.e., direct identifier, quasi-identifier) recognized by the text processor unit 430 is shown with tags that indicate a type of the identifier, each direct identifier masked by the text processer unit 430 is shown with strikethrough, and each quasi-identifier tagged by the text processor unit 430 is shown with additional tags that indicate a type of the quasi-identifier.

terms) in the processed texts that are indicative of a particular age, a particular gender, a particular date, a particular diagnosis, or a particular procedure are recognized as quasi-identifiers (e.g., the date "Aug. 14, 2013" in the processed text corresponding to Document 3 is tagged with a start tag <date> and an end tag </date>).

As further shown in Table 2, one or more NLP annotators applied to the processed texts are not able to recognize all direct identifiers and/or all quasi-identifiers in the text. For example, direct identifiers "ID43729" and "ID53265" and quasi-identifiers like "Crohn's disease" are not recognized by the NLP annotators. The system 330 is configured to conceal direct identifiers and quasi-identifiers in the text documents that are not recognized by the text processor unit 430 (e.g., "ID . . . "). For example, the term filter unit 450 selects unique terms and low-frequency terms (e.g., "ID . . . ") occurring in the processed texts for pruning (see Table 3 below). The invention guarantees that text resulting from the text de-identification is fully de-identified, even if the NLP annotators applied were unable to recognize all personal and sensitive information.

TABLE 2

Document 1

PHYSICIAN: <DI_PROC>Dudley, Carmen</DI_PROC>, M.D.
<DI_PROC>Jane Alan</DI_PROC> (ID43729) is a <QI_PROC><age>70-year-old</age></QI_PROC> <QI_PROC><gender> woman</gender></QI_PROC>with a history of a <QI_PROC><diagnosis>left renal mass</diagnosis></QI_PROC> who presented for <QI_PROC><procedure>laparoscopic partial nephrectomy</procedure></QI_PROC>. <QI_PROC><gender> She</gender></QI_PROC>was admitted on <QI_PROC><date>Aug 15, 2013</date></QI_PROC> and discharged on <QI_PROC><date>Aug 17, 2013</date></QI_PROC>.<QI_PROC><gender>She</gender></QI_PROC> was instructed to follow up with Dr. <DI_PROC>Becket</DI_PROC>.

Document 2

PHYSICIAN: <DI_PROC>Dudley, Carmen</DI_PROC>, M.D.
<QI_PROC><gender>Mr.</gender></QI_PROC> <DI_PROC>Ted Borret</DI_PROC> is <QI_PROC><age>65-y. o.</age></QI_PROC> (ID53265). <QI_PROC><gender>He</gender></QI_PROC>was admitted on <QI_PROC><date>Aug 16, 2013</date></QI_PROC> to evaluate for <QI_PROC><diagnosis>weakness and balance issues</diagnosis></QI_PROC>. <QI_PROC><gender>His</gender></QI_PROC> blood pressure was found low and was instructed to rest. <QI_PROC><gender>He</gender></QI_PROC>was discharged on <QI_PROC><date>Aug 16, 2013</date></QI_PROC>. <QI_PROC><gender>He</gender></QI_PROC>was given no prescription.

Document 3

PHYSICIAN: <DI_PROC>Bob, Veep</DI_PROC>, M.D.
<DI_PROC>Cathie Trian</DI_PROC> (ID54355) is a <QI_PROC><age>68 years old</age></QI_PROC> <QI_PROC><gender>female</gender></QI_PROC> with Crohn's disease. Attended cycling event and experienced breathing difficulties. Went to the emergency department and elevated heart enzymes were found. Was admitted on <QI_PROC><date>Aug 14, 2013</date></QI_PROC> to the ICU for care of <QI_PROC><diagnosis>pneumonia</diagnosis></QI_PROC> and discharged on <QI_PROC><date>Aug 17, 2013</date></QI_PROC>. <QI_PROC><gender>She</gender></QI_PROC> was instructed to follow up with Dr. <DI_PROC>Boris</DI_PROC>.

As shown in Table 2, names in the processed texts are recognized as direct identifiers (e.g., the names "Dudley, Carmen", "Jane Alan", "Becket", "Ted Borret", "Bob, Veep", "Cathie Trian", and "Boris" are shown with strikethrough). As further shown in Table 2, one or more words (or Table 3 below provides an example union of terms/tokens produced by the text parser unit 440. For reference, each infrequent term/token selected for pruning by the term filter unit 450 is shown with strikethrough.

TABLE 3

| a | ~~cycling~~ | ~~event~~ | ~~id43729~~ | ~~of~~ | the | ~~heart~~ |
|---|---|---|---|---|---|---|
| admitted | ~~department~~ | ~~experienced~~ | ~~id53265~~ | on | to | ~~enzymes~~ |
| and | ~~difficulties~~ | follow | ~~id54355~~ | physician | up | |
| attended | discharged | for | instructed | ~~elevated~~ | was | |
| ~~blood~~ | ~~disease~~ | ~~found~~ | is | ~~prescription~~ | ~~went~~ | |
| ~~breathing~~ | dr. | ~~given~~ | low | ~~presented~~ | ~~were~~ | |
| ~~care~~ | ~~emergency~~ | ~~history~~ | m.d. | ~~pressure~~ | ~~who~~ | |
| ~~Crohn's~~ | ~~evaluate~~ | ~~icu~~ | ~~no~~ | ~~rest~~ | with | |

Table 4 below provides example infrequent terms/tokens selected for pruning but subsequently recognized as innocuous and reinstated by the term reinstatement unit 460. For reference, each infrequent term/token subsequently recognized as innocuous and reinstated by the term reinstatement unit 460 is shown in bold.

TABLE 4

| a | ~~cycling~~ | event | ~~id43729~~ | of | the | ~~heart~~ |
|---|---|---|---|---|---|---|
| admitted | department | experienced | ~~id53265~~ | on | to | ~~enzymes~~ |
| and | ~~difficulties~~ | follow | ~~id54355~~ | physician | up | |
| attended | discharged | for | instructed | ~~elevated~~ | was | |
| ~~blood~~ | ~~disease~~ | found | is | prescription | went | |
| ~~breathing~~ | dr. | given | ~~low~~ | presented | were | |
| care | ~~emergency~~ | history | m.d. | ~~pressure~~ | who | |
| ~~Chrohn's~~ | evaluate | ~~icu~~ | no | ~~rest~~ | with | |

As shown in Table 4, the infrequent terms "care", "department", "evaluate", "event", "experienced", "found", "given", "history", "no", "of", "prescription", "presented", "went", "were", and "who" selected for pruning (see Table 3) are subsequently recognized as innocuous and reinstated.

Let PLQ generally denote a list of known quasi-identifiers. In one example, assume the PLQ is represented in accordance with listing (1) provided below:

$$PLQ = \{\{age, gender\}, \{dates\}, \{diagnoses\}\} \quad (1),$$

wherein the PLQ comprises the following elements: (1) a first element ("PLQ Element 1") representing a first structured representation {age, gender} for maintaining values for the known types of quasi-identifiers age and gender, (2) a second element ("PLQ Element 2") representing a second structured representation {dates} for maintaining a value for the known type dates, and (3) a third element ("PLQ Element 3") representing a third structured representation {diagnoses} for maintaining a value for the known type diagnosis.

Table 5 below provides example quasi-identifiers extracted from the processed texts of Table 2 by the data representation unit 470. For reference, each quasi-identifier suppressed in the processed texts by the data representation unit 470 is shown with strikethrough.

TABLE 5

Document 1

<QI_PROC><age>70-year-old</age></QI_PROC>
<QI_PROC><gender>woman</gender></QI_PROC>
<QI_PROC><gender>she</gender></QI_PROC>
<QI_PROC><diagnosis>left renal mass</diagnosis></QI_PROC>
~~<QI_PROC><procedure>aparoscopic partial nephrectomy<procedure></QI_PROC>~~
<QI_PROC><date>Aug 15, 2013</date></QI_PROC>
<QI_PROC><date>Aug 17, 2013</date></QI_PROC>

Document 2

<QI_PROC><gender>mr.</gender></QI_PROC>
<QI_PROC><gender>he</gender></QI_PROC>
<QI_PROC><gender>his</gender></QI_PROC>
<QI_PROC><age>65-y.o.</age></QI_PROC>
<QI_PROC><date>Aug 16, 2013</date></QI_PROC>
<QI_PROC><date>Aug 16, 2013</date></QI_PROC>
<QI_PROC><diagnosis>weakness and balance issues</diagnosis></QI_PROC>

Document 3

<QI_PROC><age>62 years old</age></QI_PROC>
<QI_PROC><gender>female</gender></QI_PROC>
<QI_PROC><gender>she</gender></QI_PROC>
<QI_PROC><diagnosis>pneumonia</diagnosis></QI_PROC>
<QI_PROC><date>Aug 14, 2013</date></QI_PROC>
<QI_PROC><date>Aug 17, 2013</date></QI_PROC>

As shown in Table 5, each quasi-identifier extracted is tagged with tags that indicate a known type included in the PLQ. As procedure is not a known type included in the PLQ, the quasi-identifier "laparoscopic partial nephrectomy" tagged with tags that indicate procedure is suppressed.

Table 6 below provides example records of structured data created by the data representation unit 470 in accordance with PLQ Element 1.

TABLE 6

| PLQ Element 1 | | |
|---|---|---|
| ID | age | gender |
| doc1 | 70 | Female |
| doc2 | 65 | Male |
| doc3 | 68 | Female |

As shown in Table 6, each record created has a corresponding identifier (ID) indicative of a processed text that quasi-identifiers the record maintains original values for are extracted from. The quasi-identifiers are tagged with tags that indicate the known types age and gender.

Table 7 below provides example records of structured data created by the data representation unit 470 in accordance with PLQ Element 2.

TABLE 7

| PLQ Element 2 | |
|---|---|
| ID | dates <sequence> |
| doc1 | Aug. 15, 2013 → Aug. 17, 2013 |
| doc2 | Aug. 16, 2013 → Aug. 16, 2013 |
| doc3 | Aug. 14, 2013 → Aug. 17, 2013 |

As shown in Table 7, each record created has a corresponding ID indicative of a processed text that a quasi-identifier the record maintains an original value for is extracted from. The quasi-identifier is tagged with tags that indicate the known type date.

Table 8 below provides example records of structured data created by the data representation unit 470 in accordance with PLQ Element 3.

TABLE 8

| PLQ Element 3 | |
|---|---|
| ID | diagnoses <set> |
| doc1 | left renal mass |
| doc2 | weakness and balance issues |
| doc3 | Pneumonia |

As shown in Table 8, each record created has a corresponding ID indicative of a processed text that a quasi-identifier the record maintains an original value for is extracted from. The quasi-identifier is tagged with tags that indicate the known type diagnoses.

Table 9 below provides example anonymized records of structured data resulting from the data representation unit 470 applying relational 2-anonymity to the records of Table 6 to anonymize original values maintained in the records to generalized values. For reference, original values suppressed by the data representation unit 470 are shown as an asterisk (*).

TABLE 9

| PLQ Element 1 | | |
|---|---|---|
| ID | age | gender |
| doc1 | 65-70 | * |
| doc2 | 65-70 | * |
| doc3 | 65-70 | * |

Table 10 below provides example anonymized records of structured data resulting from the data representation unit 470 applying sequence 2-anonymization (order-preserving) to the records of Table 7 to anonymize original values maintained in the records to generalized values.

TABLE 10

| PLQ Element 2 | |
|---|---|
| ID | Date <sequence> |
| doc1 | Aug. {14-16}, 2013 → Aug. {16-17}, 2013 |
| doc2 | Aug. {14-16}, 2013 → Aug. {16-17}, 2013 |
| doc3 | Aug. {14-16}, 2013 → Aug. {16-17}, 2013 |

Table 11 below provides example anonymized records of structured data resulting from the data representation unit 470 applying set 2-anonymization to the records of Table 8 to anonymize original values maintained in the records to generalized values. For reference, original values suppressed by the data representation unit 470 are shown as an asterisk (*).

TABLE 12

| PLQ Element 3 | |
|---|---|
| ID | Diagnoses <set> |
| doc1 | head-related medical issue |
| doc2 | head-related medical issue |
| doc3 | * |

Table 12 below provides example anonymized records of structured data resulting from the data representation unit 470 applying micro-aggregation approach to the records of Table 9 to obtain random values computed over a micro-aggregate. For reference, each random value is shown in parenthesis.

TABLE 12

| PLQ Element 1 | | |
|---|---|---|
| ID | Age | Gender |
| doc1 | 65-70 (67) | * |
| doc2 | 65-70 (68) | * |
| doc3 | 65-70 (66) | * |

Table 13 below provides example anonymized records of structured data resulting from the data representation unit 470 applying micro-aggregation approach to the records of Table 10 to obtain random values computed over a micro-aggregate. For reference, each random value is shown in parenthesis.

TABLE 13

| | PLQ Element 2 | |
|---|---|---|
| ID | Date <sequence> | |
| doc1 | Aug. {14-16}, 2013 (Aug. 15, 2013) → Aug. {16-17}, 2013 (Aug. 16, 2013) | |
| doc2 | Aug. {14-16}, 2013 (Aug. 15, 2013) → Aug. {16-17}, 2013 (Aug. 17, 2013) | |
| doc3 | Aug. {14-16}, 2013 (Aug. 16, 2013) → Aug. {16-17}, 2013 (Aug. 17, 2013) | |

Table 14 below provides example anonymized records of structured data resulting from the data representation unit 470 applying micro-aggregation approach to the records of Table 11 to obtain random values computed over a micro-aggregate. For reference, each random value is shown in parenthesis.

TABLE 14

| | PLQ Element 3 |
|---|---|
| ID | Diagnoses <set> |
| doc1 | head-related medical problem (weakness) |
| doc2 | head-related medical problem (renal mass) |
| doc3 | * |

As shown in Tables 12-14, each random value of each record is a plausible replacement value that can be used to replace a corresponding quasi-identifier in a processed text that the quasi-identifier is extracted from. Each random value is randomly chosen from generalized values produced as a result of applying an anonymization algorithm. In the case of categorical values, random value can be randomly chosen from a set of original values, or from a subtree rooted at a node with a generalized value (e.g., "head-related medical issue").

Table 15 below provides example de-identified text documents resulting from the data representation unit 470 replacing some quasi-identifiers recognized in the processed texts of Table 2 with replacement values of Tables 12-14 and the tag removal unit 480 removing tags of all identifiers recognized in the processed texts. For reference, original values of direct/quasi-identifiers that are suppressed by the data representation unit 470 are shown as an asterisk (*) or as a set of brackets indicative of a known type of the direct/quasi-identifier (e.g., "[NAME]").

TABLE 15

De-identified Document 1

PHYSICIAN: [NAME] M.D.
[NAME] is a 65-70-year-old with a history of a head-related medical problem who presented for [PROCEDURE]. [GENDER] was admitted on Aug. 14-17, 2013 and discharged on Aug. 16-17, 2013. [GENDER] was instructed to follow up with Dr. [NAME].

De-identified Document 2

PHYSICIAN: [NAME] M.D.
[NAME] is 65-70y.o. [GENDER] was admitted on Aug. 14-16, 2013 to evaluate for head-related medical problem. [GENDER] * was found * and was instructed to *. [GENDER] was discharged on Aug. 16-17, 2013. [GENDER] was given no prescription.

De-identified Document 3

PHYSICIAN: [NAME] M.D.
[NAME] is a 65-70 years old [GENDER] with *. Attended * event and experienced *. Went to the * department and * were found. Was admitted on Aug. 14-17, 2013 to the * for care of [DIAGNOSIS] and discharged on Aug. 16-17, 2013. [GENDER] was instructed to follow up with Dr. [NAME].

As shown in Table 15, the de-identified text documents include: (1) a corresponding de-identified text document corresponding to Document 1 ("De-identified Document 1"), (2) a corresponding de-identified text document corresponding to Document 2 ("De-identified Document 2"), and (3) a corresponding de-identified text document corresponding to Document 2 ("De-identified Document 3"). As shown in Table 15, the de-identified text documents do not reveal any privacy-sensitive personal information about the physicians and the patients.

The output unit 490 releases the de-identified text documents of Table 15 to a third party for secondary use.

Figure 5:
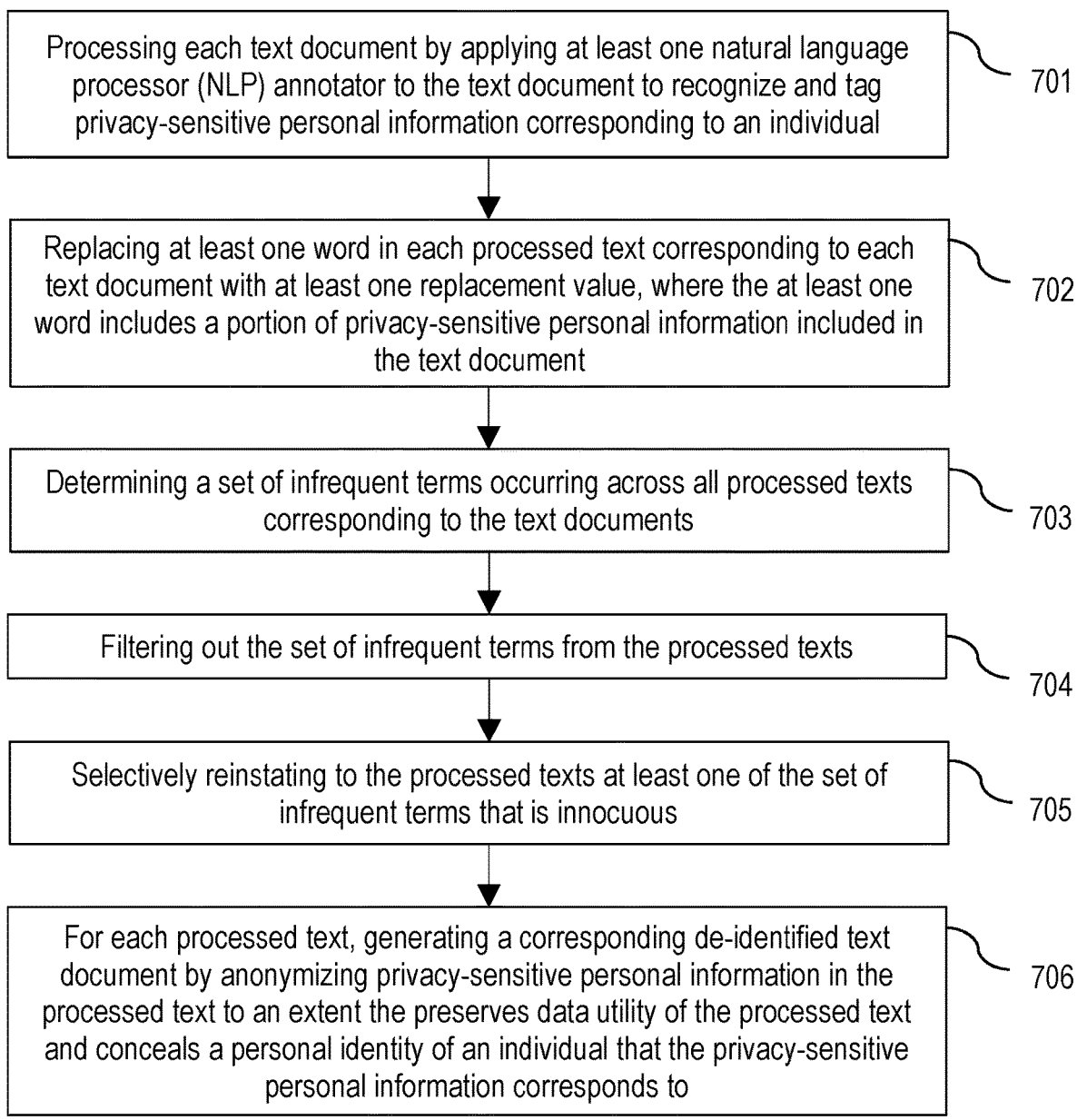
FIG. 5 is a flowchart for an example process for utility-preserving text de-identification, in accordance with an embodiment of the invention.

FIG. 5 is a flowchart for an example process 700 for utility-preserving text de-identification, in accordance with an embodiment of the invention. Process block 701 includes processing each text document by applying at least one natural language processor (NLP) annotator to the text document to recognize and tag privacy-sensitive personal information in the text document, where the privacy-sensitive personal information corresponds to an individual. Process block 702 includes replacing at least one word in each processed text corresponding to each text document with at least one replacement value, where the at least one word includes a portion of privacy-sensitive personal information included in the text document. Process block 703 includes determining a set of infrequent terms occurring across all processed texts corresponding to the text documents. Process block 704 includes filtering out the set of infrequent terms from the processed texts. Process block 705 includes selectively reinstating to the processed texts at least one of the set of infrequent terms that is innocuous. Process block 706 includes, for each processed text, generating a corresponding de-identified text document by anonymizing privacy-sensitive personal information included in the processed text to an extent the preserves data utility of the processed text and conceals a personal identity of an individual that the privacy-sensitive personal information corresponds to.

In one embodiment, process blocks 701-706 are performed by one or more components of the system 330.

Figure 6:
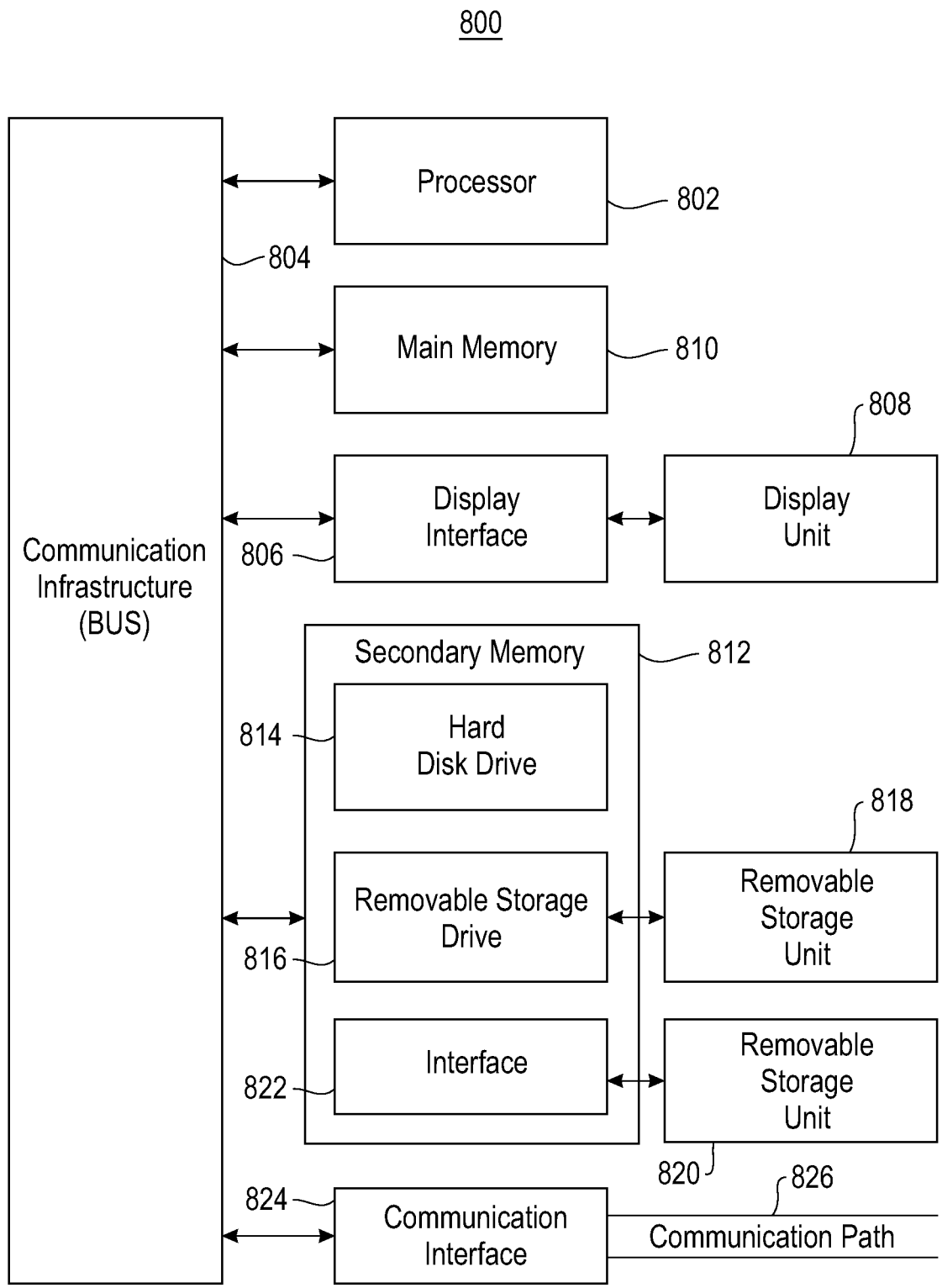
FIG. 6 is a high-level block diagram showing an information processing system useful for implementing an embodiment of the invention.

FIG. 6 is a high level block diagram showing an information processing system 800 useful for implementing one embodiment of the invention. The computer system includes one or more processors, such as processor 802. The processor 802 is connected to a communication infrastructure 804 (e.g., a communications bus, cross-over bar, or network).

The computer system can include a display interface 806 that forwards graphics, text, and other data from the voice communication infrastructure 804 (or from a frame buffer not shown) for display on a display unit 808. In one embodiment, the computer system also includes a main memory 810, preferably random access memory (RAM), and also includes a secondary memory 812. In one embodiment, the secondary memory 812 includes, for example, a hard disk drive 814 and/or a removable storage drive 816, representing, for example, a floppy disk drive, a magnetic tape drive, or an optical disk drive. The removable storage drive 816 reads from and/or writes to a removable storage unit 818 in a manner well known to those having ordinary skill in the art. Removable storage unit 818 represents, for example, a floppy disk, a compact disc, a magnetic tape, or an optical disk, etc. which is read by and written to by removable storage drive 816. As will be appreciated, the removable storage unit 818 includes a computer readable medium having stored therein computer software and/or data.

In alternative embodiments, the secondary memory 812 includes other similar means for allowing computer programs or other instructions to be loaded into the computer system. Such means include, for example, a removable storage unit 820 and an interface 822. Examples of such means include a program package and package interface (such as that found in video game devices), a removable memory chip (such as an EPROM, or PROM) and associated socket, and other removable storage units 820 and interfaces 822, which allows software and data to be transferred from the removable storage unit 820 to the computer system.

In one embodiment, the computer system also includes a communication interface 824. Communication interface 824 allows software and data to be transferred between the computer system and external devices. In one embodiment, examples of communication interface 824 include a modem, a network interface (such as an Ethernet card), a communication port, or a PCMCIA slot and card, etc. In one embodiment, software and data transferred via communication interface 824 are in the form of signals which are, for example, electronic, electromagnetic, optical, or other signals capable of being received by communication interface 824. These signals are provided to communication interface 824 via a communication path (i.e., channel) 826. In one embodiment, this communication path 826 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for utility-preserving text de-identification, comprising:
    for each text document of a set of text documents, generating corresponding processed text by:
        applying at least one natural language processor (NLP) annotator to the text document to recognize and tag privacy-sensitive personal information corresponding to an individual; and
        replacing at least one word in the text document with at least one replacement value, wherein the at least one word includes a portion of the privacy-sensitive personal information; and
    for each processed text corresponding to each text document of the set of text documents:
        determining a union of terms appearing in the processed text, wherein the union of terms excludes privacy-sensitive personal information tagged in the processed text;
        determining which terms of the union of terms are infrequent, wherein a term of the union of terms is infrequent if a number of text documents from the set of text documents that contain the term is less than a frequency threshold derived from a dictionary for direct identifiers;
        filtering out each infrequent term from the processed text;
        for each infrequent term filtered out from the processed text:
            determining whether the infrequent term filtered out is neither a direct identifier nor a quasi-identifier based on a whitelist of innocuous terms; and reinstating the infrequent term filtered out to the processed text in response to determining the infrequent term filtered out is neither a direct identifier nor a quasi-identifier; and generating a corresponding de-identified text document by anonymizing the privacy-sensitive personal information tagged in the processed text to an extent that preserves data utility of the processed text and conceals a personal identity of an individual that the privacy-sensitive personal information tagged in the processed text corresponds to.

2. The method of claim 1, wherein each privacy-sensitive personal information corresponding to each individual comprises at least one of: a direct identifier, or a quasi-identifier.

3. The method of claim 2, wherein generating corresponding processed text further comprises:
tagging each identifier recognized in the text document with a set of tags indicative of a type of the identifier;
masking an original value of each direct identifier recognized in the text document with a masked value; and
tagging each quasi-identifier recognized in the text document with another set of tags indicative of a type of the quasi-identifier.

4. The method of claim 3, further comprising:
for each processed text corresponding to each text document of the set of text documents:
determining, for each term of the union of terms appearing in the processed text, a corresponding term frequency indicative of a number of text documents from the set of text documents that contain the term; and
determining which terms of the union of terms are infrequent based on each term frequency corresponding to each term of the union of terms and the frequency threshold, wherein each infrequent term has a corresponding term frequency that is less than the frequency threshold.

5. The method of claim 4, further comprising:
for each processed text, generating one or more corresponding records of structured data, wherein each corresponding record maintains one or more original values for one or more quasi-identifiers tagged in the processed text, and the one or more quasi-identifiers are included in a list of known quasi-identifiers.

6. The method of claim 5, wherein anonymizing privacy-sensitive personal information included in the processed text comprises:
anonymizing one or more original values maintained in one or more corresponding records, and replacing the one or more original values in the processed text with one or more resulting anonymized values.

7. The method of claim 6, wherein anonymizing privacy-sensitive personal information included in the processed text further comprises:
for each identifier tagged in the processed text, removing each tag that the identifier is tagged with from the processed text.

8. A system for utility-preserving text de-identification, comprising:
at least one processor; and
a non-transitory processor-readable memory device storing instructions that when executed by the at least one processor causes the at least one processor to perform operations including:
for each text document of a set of text documents, generating corresponding processed text by:
applying at least one natural language processor (NLP) annotator to the text document to recognize and tag privacy-sensitive personal information corresponding to an individual; and
replacing at least one word in the text document with at least one replacement value, wherein the at least one word includes a portion of the privacy-sensitive personal information; and
for each processed text corresponding to each text document of the set of text documents:
determining a union of terms appearing in the processed text, wherein the union of terms excludes privacy-sensitive personal information tagged in the processed text;
determining which terms of the union of terms are infrequent, wherein a term of the union of terms is infrequent if a number of text documents from the set of text documents that contain the term is less than a frequency threshold derived from a dictionary for direct identifiers;
filtering out each infrequent term from the processed text;
for each infrequent term filtered out from the processed text:
determining whether the infrequent term filtered out is neither a direct identifier nor a quasi-identifier based on a whitelist of innocuous terms; and
reinstating the infrequent term filtered out to the processed text in response to determining the infrequent term filtered out is neither a direct identifier nor a quasi-identifier; and generating a corresponding de-identified text document by anonymizing the privacy-sensitive personal information tagged in the processed text to an extent that preserves data utility of the processed text and conceals a personal identity of an individual that the privacy-sensitive personal information tagged in the processed text corresponds to.

9. The system of claim 8, wherein each privacy-sensitive personal information corresponding to each individual comprises at least one of: a direct identifier, or a quasi-identifier.

10. The system of claim 9, wherein generating corresponding processed text further comprises:
tagging each identifier recognized in the text document with a set of tags indicative of a type of the identifier;
masking an original value of each direct identifier recognized in the text document with a masked value; and
tagging each quasi-identifier recognized in the text document with another set of tags indicative of a type of the quasi-identifier.

11. The system of claim 10, wherein the operations further comprise:
for each processed text corresponding to each text document of the set of text documents:
determining, for each term of the union of terms appearing in the processed text, a corresponding term frequency indicative of a number of text documents from the set of text documents that contain the term; and
determining which terms of the union of terms are infrequent based on each term frequency corresponding to each term of the union of terms and the frequency threshold, wherein each infrequent term has a corresponding term frequency that is less than the frequency threshold.

12. The system of claim 11, wherein the operations further comprise:
for each processed text, generating one or more corresponding records of structured data, wherein each corresponding record maintains one or more original values for one or more quasi-identifiers tagged in the processed text, and the one or more quasi-identifiers are included in a list of known quasi-identifiers.

13. The system of claim 12, wherein anonymizing privacy-sensitive personal information included in the processed text comprises:
anonymizing one or more original values maintained in one or more corresponding records, and replacing the one or more original values in the processed text with one or more resulting anonymized values.

14. The system of claim 13, wherein anonymizing privacy-sensitive personal information included in the processed text further comprises:
for each identifier tagged in the processed text, removing each tag that the identifier is tagged with from the processed text.

15. A computer program product for utility-preserving text de-identification, the computer program product comprising a computer readable storage medium having program instructions embodied therewith, the program instructions executable by a processor to cause the processor to:
for each text document of a set of text documents, generating corresponding processed text by:
applying at least one natural language processor (NLP) annotator to the text document to recognize and tag privacy-sensitive personal information corresponding to an individual; and
replacing at least one word in the text document with at least one replacement value, wherein the at least one word includes a portion of the privacy-sensitive personal information; and for each processed text corresponding to each text document of the set of text documents:
determining a union of terms appearing in the processed text, wherein the union of terms excludes privacy-sensitive personal information tagged in the processed text;
determining which terms of the union of terms are infrequent, wherein a term of the union of terms is infrequent if a number of text documents from the set of text documents that contain the term is less than a frequency threshold derived from a dictionary for direct identifiers;
filtering out each infrequent term from the processed text;
for each infrequent term filtered out from the processed text:
determining whether the infrequent term filtered out is neither a direct identifier nor a quasi-identifier based on a whitelist of innocuous terms; and
reinstating the infrequent term filtered out to the processed text in response to determining the infrequent term filtered out is neither a direct identifier nor a quasi-identifier; and
generating a corresponding de-identified text document by anonymizing the privacy-sensitive personal information tagged in the processed text to an extent that preserves data utility of the processed text and conceals a personal identity of an individual that the privacy-sensitive personal information tagged in the processed text corresponds to.

16. The computer program product of claim 15, wherein each privacy-sensitive personal information corresponding to each individual comprises at least one of: a direct identifier, or a quasi-identifier.

* * * * *